(12) United States Patent
Hundt et al.

(10) Patent No.: US 10,150,405 B2
(45) Date of Patent: Dec. 11, 2018

(54) END CAP FOR AN ILLUMINATED TRIM STRIP ARRANGEMENT AND TRIM STRIP ARRANGEMENT

(71) Applicant: Dura Automotive Holdings U.K., Ltd, Birmingham (GB)

(72) Inventors: Torsten Hundt, Neuenrade (DE); Antje Krehmer, Lüdenscheid (DE); Oliver Deuscher, Engstingen (DE); Markus Fisch, Sindelfingen (DE); Joaquin Rodrigo Pastor, Stuttgart (DE)

(73) Assignee: DURA AUTOMOTIVE HOLDINGS, U.K., LTD, Birmingham (GB)

( * ) Notice: Subject to any disclaimer, the term of this patent is extended or adjusted under 35 U.S.C. 154(b) by 0 days.

(21) Appl. No.: 15/667,063

(22) Filed: Aug. 2, 2017

(65) Prior Publication Data
US 2018/0037157 A1    Feb. 8, 2018

(30) Foreign Application Priority Data

Aug. 3, 2016 (DE) .................. 10 2016 114 353

(51) Int. Cl.
| | |
|---|---|
| *B60Q 1/26* | (2006.01) |
| *B60J 10/265* | (2016.01) |
| *B60J 10/74* | (2016.01) |
| *F21S 4/00* | (2016.01) |
| *F21V 7/22* | (2018.01) |

(Continued)

(52) U.S. Cl.
CPC .......... *B60Q 1/2661* (2013.01); *B60J 10/265* (2016.02); *B60J 10/74* (2016.02); *B60J 10/75* (2016.02); *B60Q 1/323* (2013.01); *B60R 13/04* (2013.01); *F21S 4/00* (2013.01); *F21S 43/237* (2018.01); *F21S 43/245* (2018.01); *F21V 7/22* (2013.01);

(Continued)

(58) Field of Classification Search
CPC .......... B60J 10/265; B60J 10/74; B60J 10/75; B60Q 1/2661; B60Q 1/323; B60Y 2410/122; F21S 4/00; F21S 43/237; F21S 43/245; B60R 13/04; F21V 7/22; F21Y 2103/00; G02B 6/0001
See application file for complete search history.

(56) References Cited

U.S. PATENT DOCUMENTS

| | | | |
|---|---|---|---|
| 3,742,649 A | 7/1973 | Dochnahl | |
| 8,596,840 B2 * | 12/2013 | Gold | ............... B60Q 1/323 296/201 |

(Continued)

FOREIGN PATENT DOCUMENTS

| | | |
|---|---|---|
| DE | 102015100327 A1 | 7/2016 |
| EP | 2823999 A2 | 1/2015 |

*Primary Examiner* — Seung H Lee
(74) *Attorney, Agent, or Firm* — Robert E. Ford; Raymond J. Vivacqua; Steven L. Crane

(57) ABSTRACT

A trim strip arrangement is provided. The trim strip arrangement includes a profiled strip which partially covers a sealing profile and an end portion uniform lighting of a light gap without negatively affecting the external appearance of the trim strip arrangement. Provision is made for an external surface of the end portion to be configured as a visible surface which is optically matched to the external appearance of the adjoining sealing profile, and for an internal surface to be configured at least partially as a reflection surface which has a reflectivity which is increased with respect to the visible surface.

28 Claims, 2 Drawing Sheets

(51) Int. Cl.
 *F21V 8/00* (2006.01)
 *B60Q 1/32* (2006.01)
 *B60R 13/04* (2006.01)
 *B60J 10/75* (2016.01)
 *F21S 43/237* (2018.01)
 *F21S 43/245* (2018.01)
 *F21Y 103/00* (2016.01)

(52) U.S. Cl.
 CPC ...... *G02B 6/0001* (2013.01); *B60Y 2410/122* (2013.01); *F21Y 2103/00* (2013.01)

(56) References Cited

U.S. PATENT DOCUMENTS

2014/0049977 A1\* 2/2014 Gold .................. B60J 5/0402
 362/549
2018/0001815 A1\* 1/2018 Hundt ................ B60Q 1/2661

\* cited by examiner

END CAP FOR AN ILLUMINATED TRIM STRIP ARRANGEMENT AND TRIM STRIP ARRANGEMENT

CROSS-REFERENCE TO RELATED APPLICATION

This application claims priority under 35 U.S.C. § 119 to German patent application DE 10 2016 114 353.7, filed Aug. 3, 2016, the disclosure of which is incorporated herein by reference in its entirety.

TECHNICAL FIELD

The invention relates to an illuminated trim strip arrangement for a motor vehicle, more particularly, to an illuminated trim strip arrangement having an end portion which forms the front-face closure of the trim strip arrangement.

BACKGROUND

The statements in this section merely provide background information related to the present disclosure and may or may not constitute prior art.

The invention proceeds from an illuminated trim strip arrangement for a motor vehicle having an end portion which forms the front-face closure of the trim strip arrangement, in particular from a trim strip arrangement which can be placed onto the vehicle body in the region of a window channel or a window frame of a motor vehicle door, wherein the end portion has an external surface, which is visible from the outside in the intended final installation state, and an internal surface not visible from the outside, which is located on the inside in the intended final installation state and onto which the light that is emitted by a light-emitting means is incident before it visibly emerges to the outside from the trim strip arrangement.

Illuminated trim strip arrangements that can be placed onto a part of a motor vehicle body in the region of a window channel or a window frame of a motor vehicle door are known, for example, from WO 2015/154972 A1 and DE 10 2014 015 186 A1. In trim strip arrangements of this type, a profiled strip is placed onto a sealing profile and supported thereby. The sealing profile in turn is placed onto the body and held there. In the final mounted state, the profiled strip arrangement forms a light gap between a lower visible edge and the adjoining external vehicle surface, from which the light emitted by a light-emitting means that is located behind the profiled strip visibly emerges to the outside. The invention also proceeds from such a trim strip arrangement below.

For a high-quality overall impression it is necessary for the light gap to be lit very uniformly over its entire length. Tests have shown that uniform lighting of the light gap over the entire length of the trim strip arrangement, i.e. in particular over the entire length of the window sill, can be achieved only with great difficulty, because lighting of the light gap or the reflections on the vehicle outer skin that are perceivable on the outside are very "sensitive" to minor changes, for example in the guiding and retaining of the light guide used as the light-emitting means. Even minor deviations or irregularities in the reflectivity of the surfaces located behind the profiled strip or in the light gap width or in the guiding, retaining and positioning of the light guide are perceived from the outside as irregular lighting of the light gap. Lighting or reflection differences that are clearly perceivable from the outside can also occur at component transitions, i.e. at locations where different components of the trim strip arrangement meet, and where, viewed in the longitudinal direction, a material or surface change occurs within the trim strip arrangement. Achieving uniform lighting in the region of the end of the trim strip arrangement is particularly difficult, because here the light guide used as the light-emitting means must kink into the vehicle interior while changing its direction of extent in a manner which is not visible from the outside, and also the trim strip arrangement must find an optically pleasing structural "closure", which in turn requires the use of an end portion which meets these requirements.

Against this background, there is a need to provide one of the above-described trim strip arrangements having an end portion that permits uniform lighting, without negatively affecting the external appearance of the trim strip arrangement. The intention is in particular to avoid irregularities in the end region of the trim strip arrangement and in the external appearance of the trim strip arrangement when lighting the light gap, with the result that a consistently harmonious appearance is obtained over the entire length of the trim strip in the illuminated and non-illuminated state.

SUMMARY

The external surface of the end portion is configured at least partially as a visible surface, which is matched to, or matches, the external appearance of a surface, which is visible from the outside, of an adjoining component, or of a component which extends from the end portion, of the trim strip arrangement in the final installation state in particular in terms of colour, and the internal surface is configured at least partially as a reflection surface that has a reflectivity which is different, in particular increased, with respect to the visible surface. The reflectivity of the reflection surface is here preferably matched to, or matches, the reflectivity in the reflection region of the trim strip arrangement located outside the end portion, which is relevant for the lighting of the light gap outside the portion of the trim strip arrangement that is taken up by the closure part end portion.

What is achieved here is that the trim strip end portion which is to be provided at the end side of the trim strip arrangement and has external surfaces which are at least partially also perceivable from the outside, in particular those surfaces of the typically black sealing profile, on which the profiled strip is placed and held, that are visible from the outside, can optically extend further. At the same time, the deliberate configuration of a relevant part of the internal surface as a reflection surface ensures that no differences that are perceivable from the outside are detectable at the transition into the end portion, starting from an adjoining component, or from a component which continues with the end portion, and the material change which may be associated therewith, when lighting the light gap, because the reflectivity behind the profiled strip does not change in such a way that a light gap lighting difference which is perceivable from the outside is produced.

Typically, the visible surface will have a colouration that continues the colouration of an adjoining sealing profile or the adjoining profiled strip. In this way, the transition of the sealing profile or profiled strip into the end portion can be effectively optically concealed.

Provision may be made for a reflection coating to be applied on the end portion in the region of the reflection surface. Such a coating can be formed from a (coloured) varnish or a reflection coating which is applied in some other way.

However, provision may also be made for the material region forming the reflection surface of the end portion not to be coated. In such a case, provision is made with preference for that material region of the end portion which forms the reflection surface of the end portion to be formed by a first material, and for that material portion of the end portion that forms the visible surface to be formed by a second material, wherein a surface that is formed from the first material has, with respect to a surface which is formed from the second material, a reflectivity which is different, in particular increased, with respect to the second material.

The first material and the second material here do not necessarily need to be different to the extent that they are different basic materials. Instead, both material portions of the end portion can be made from the same basic material, for example from the same "basic plastics material", with the first material and the second material merely being provided with different additives, in particular fillers or colourants. For example, the first material can be provided in particular with at least one additive that increases reflectivity and is not present in the second material. Alternatively, the second material can be provided with at least one additive that reduces reflectivity and is not present in the first material. Provision may be made in particular for the visible surface to be black so as to continue the adjoining surface of the typically black sealing profile, while the reflection surface is preferably white.

In order to provide both different material portions at the component, provision is preferably made for the end portion to be a component produced in a multicomponent injection moulding process or to be a component portion produced in a multicomponent injection moulding process.

Provision is made with preference for the trim strip arrangement to be a channel strip seal. Provision can in particular be made here for the trim strip arrangement to comprise a sealing strip, configured as a single-piece component composite, with preferably extruded sealing lips and a (steel) inlay, wherein the end portion is in particular integrally moulded to this sealing strip, for example injection moulded, adhered to or vulcanized to this sealing strip. However, provision may alternatively also be made in the trim strip arrangement for the end portion to be a component which is separate from the sealing profile and the profiled strip and to be placed in an end-side fashion onto the sealing profile or the profiled strip and to be held there in a clamping fashion in particular as a front-face closure part. The closure part thus forms an end cap which is able to be placed onto the trim strip arrangement.

Further features and advantages of the invention can be gathered from the dependent claims and from the following description of preferred exemplary embodiments with reference to the drawings.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
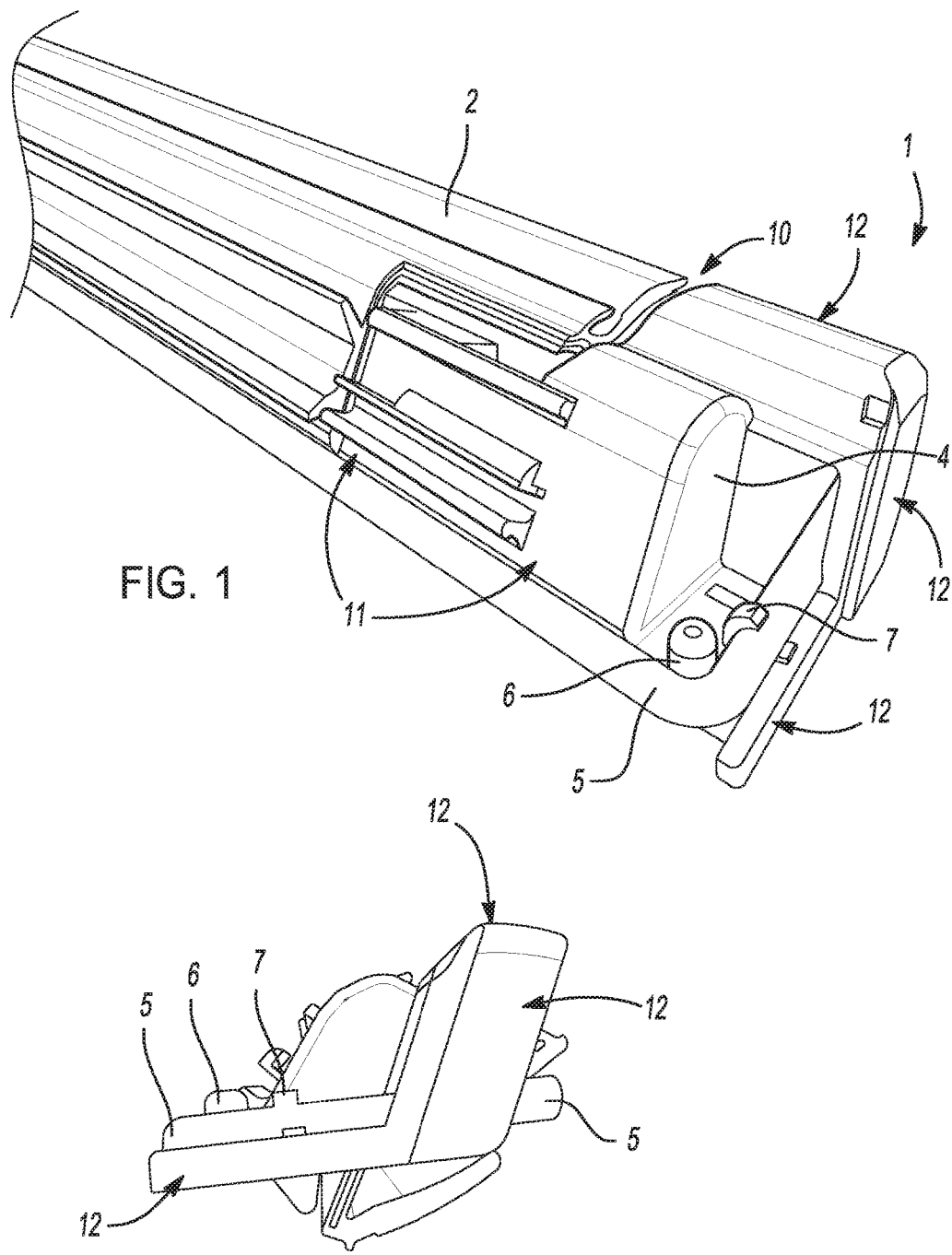
FIG. 1 shows a perspective illustration of an end region of a trim strip arrangement having a light guide used as a light-emitting means, with the omission of the profiled strip which partially covers a sealing strip and an end portion of the trim strip arrangement from the drawing, according to an exemplary embodiment.
FIG. 2 shows the trim strip arrangement of FIG. 1 in an illustration with a view onto the front-side face.

FIG. 1 shows a trim strip arrangement 1 having an end portion 4, which serves as a front-face closure, and a light guide 5, which is used as a light-emitting means, in a perspective view without a profiled strip 3 (see FIG. 3) covering a sealing profile 2. This trim strip arrangement in parts corresponds to the arrangements disclosed in documents WO 2015/154972 A1 and DE 10 2014 015 186 A1, which were mentioned in the introductory part, and are incorporated herein by reference in their entireties.

The sealing profile 2, illustrated in FIG. 1, is adapted to be placed onto the corresponding body portion of a vehicle door as a window channel sealing. At the end side, the sealing profile 2 is provided in the direction of the front-face end portion of the trim strip arrangement with the end portion 4, which ultimately closes the trim strip arrangement 1 at the end side, to form a joint.

The light guide 5 extends in the longitudinal direction along the sealing profile 2 over the joint between the sealing profile 2 and the end portion 4 to then be placed, immediately in front of the front-face closure of the trim strip arrangement 1, around a deflection pin 6 in a radius such that it is kinked by approximately 90°. Subsequently, the light guide 5 passes through a light guide holder 7, which grips it circumferentially, and a through opening provided in the end portion 4, through which the light guide is guided into the vehicle interior to a light input device.

FIG. 2 shows the trim strip arrangement illustrated in FIG. 1 for further clarity in an illustration with a view onto the front-face end of the trim strip arrangement, again without the profiled strip 3.

Figure 3:
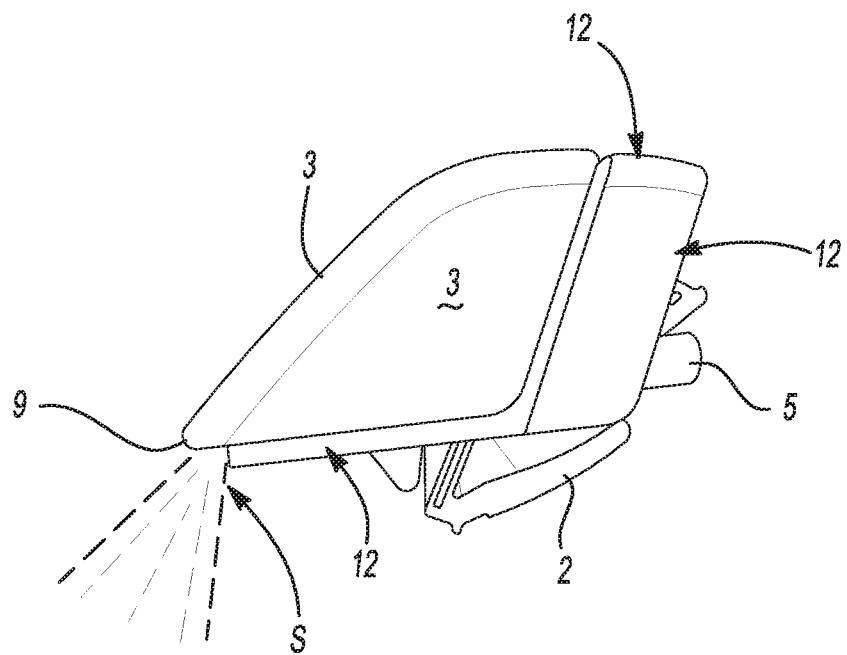
FIG. 3 shows the trim strip arrangement of FIG. 2 with the profiled strip placed onto the sealing profile.

Not shown in FIG. 1 and FIG. 2, but shown in FIG. 3, from the front face, is a profiled strip 3, which is arranged in the intended final installation state of the trim strip arrangement also over the end portion 4 and the sealing profile 2. This profiled strip 3 is preferably a non-light-transmissive strip component, for instance a preferably extruded, polished, brushed, coated or varnished metal profile which, when placed as intended on the sealing profile 2 and the end portion 4 in a partially covering manner, extends over nearly the entire length of the trim strip arrangement and acts as a trim and covering strip of the sealing profile 2 and the end portion 4 and also extends over the joint, which is formed in the region of the transition from the central portion of the sealing profile 2 to the end portion 4 thereof, such that the joint is not visible, with the exception of an upper joint portion 10.

At the front-face end, illustrated in FIG. 3, a material region of the trim strip is placed so as to optically close or cover the end of the end portion 4 which is largely open in terms of material on the front face.

As shown in particular in the already mentioned documents WO 2015/154972 A1 and DE 10 2014 015 186 A1, and as is schematically also shown in FIG. 3, light, which is symbolized in FIG. 3 by way of the thin radiation lines emerging from a light gap S, emerges from the light gap S between the lower visible edge of the profiled strip 3 and the end portion 5 or the sealing profile 2 if the illumination is switched on. The light gap S, through which the light emitted by the light guide 5 emerges to the outside, is formed by a gap between the lower visible edge 9 of the profiled strip and the sealing profile 2 or between the lower visible edge 9 of the profiled strip and the vehicle external surface which adjoins the trim strip arrangement in the intended final installation state. The light gap S extends, with a constant light gap width, over the entire length of the trim strip arrangement.

As can be seen from all the illustrations, located at the joint is an upper joint portion 10 which is not covered by the profiled strip 3 once the latter is placed thereon. This joint portion 10 is thus adjoined by part of an external surface 12 of the end portion 4, which is also visible from the outside in the case of the profiled strip in the intended final installation state. In particular, the transition from the typically black sealing profile 5 to the external surface 12 of the end portion 4 is visible at the upper joint portion 10.

In the region which is covered in the intended final installation state by the profiled strip and in which the light guide 5 passes the end portion 4, the end portion 4 has an internal surface 11 which is covered by the profiled strip 3 in the final installation state and therefore not visible from the outside. The light emitted by the light guide 5 is partially reflected by this internal surface 11 and emerges at least partially through the light gap to the outside. In order to ensure uniform light passage through the light gap over the entire length of the trim strip arrangement, care must be taken that the internal surface of the end portion 4, which partially reflects the light emitted by the light guide 5, is configured such that the light is reflected to the outside to a sufficient degree and is not "swallowed" by the internal surface, with the result that there are no irregularly illuminated zones on the vehicle outer skin.

It can be seen that the requirement of the external surface 12 of the end cap to optically harmoniously continue the externally visible partial surfaces of the typically matt-black rubber sealing profile over the upper joint portion 10 without optical break does not agree with the simultaneous requirement of the internal surface 11 of the end portion to have a reflectivity which is as high as possible. For this reason, provision is made for the external surface 12 to be formed at least partially as a visible surface, which is matched to the external appearance of the sealing profile portion which adjoins this external surface 12 and is visible from the outside, and for the internal surface 11 to be formed at least partially as a reflection surface which has increased reflectivity with respect to the external surface 12 or the part of the external surface 12 which is formed as a visible surface.

Figure 4:
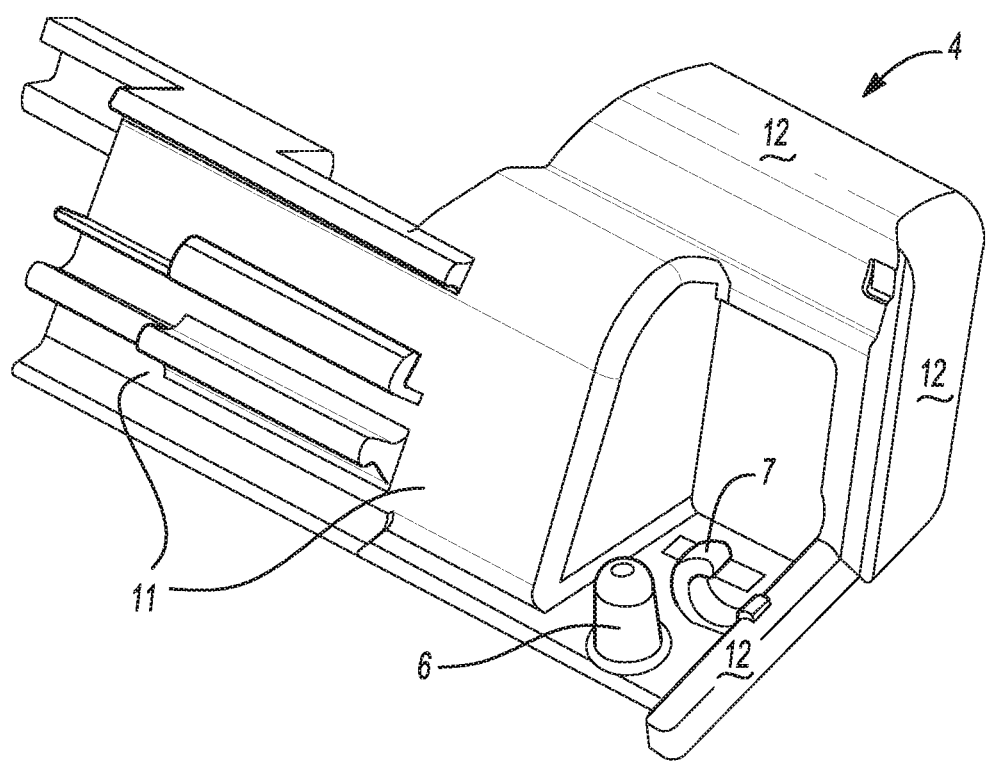
FIG. 4 shows the end portion, already shown in the previous figures, of the trim strip arrangement in individual illustration, in which a second material portion forming a visible surface is highlighted in the drawing by way of cross hatching.

FIG. 4, which shows the end portion that can already be seen in the previous figures in an individual illustration without the further sealing profile, clarifies this measure by way of crosshatching of the material portion which acts as a visible surface and should be considered part of the external surface 12, while the remaining material portion of the end portion 4, i.e. including the material portion of the internal surface 11 which acts as a reflection surface, is illustrated without hatching.

In the exemplary embodiment shown in FIG. 4, the material portion forming the reflection surface of the end portion is formed from a first material, and the material portion forming the visible surface is formed from a second material. The reflection surface which is formed from the first material preferably has a very light colour and thus has an increased reflectivity with respect to the visible surface. The visible surface, which is formed from the second material and is matched to the typically matt-black exterior of the sealing profile, preferably has a black or dark grey colour with typically low reflectivity.

The end portion of the sealing profile, illustrated in FIG. 4, is preferably produced in the multicomponent injection moulding process to form the end portion 4 from both a first material and a second material.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. An illuminated trim strip arrangement for a motor vehicle, wherein the illuminated trim strip is configured to hold a light emitting means and to be placed onto the vehicle body in the region of a window channel or a window frame of a motor vehicle door in an intended final installation state, comprising
   an end portion forming the front-face closure of the trim strip arrangement, wherein the end portion includes an external surface visible from the outside in the intended final installation state, and an internal surface located on the inside in the intended final installation state and onto which at least a portion of the light that is emitted by the light-emitting means is incident before the light visibly emerges to the outside from the trim strip arrangement in the final installation state,
   wherein the external surface is configured at least partially as a visible surface matching the external appearance of a surface of an adjoining component, or of a component extending from the end portion, of the trim strip arrangement in the final installation state; and
   wherein the internal surface is configured at least partially as a reflection surface that has a reflectivity that is different with respect to the visible surface.

2. The trim strip arrangement of claim 1, wherein the region of the reflection surface is not coated.

3. The trim strip arrangement of claim 1, further comprising a reflection coating applied in the region of the reflection surface.

4. The trim strip arrangement of claim 1, further comprising:
   a material portion of the end portion forming the reflection surface of the end portion is formed from a first material; and
   a material portion of the end portion forming the visible surface is formed from a second material;
   wherein the material portion of the end portion forming the reflection surface of the end portion is formed from a first material includes a reflectivity that is different with respect to the material portion of the end portion forming the visible surface is formed from a second material.

5. The trim strip arrangement of claim 4, wherein the first material or the second material is provided with at least one additive that influences the reflectivity and is not present in the respectively other material.

6. The trim strip arrangement of claim 5, further comprising a sealing profile or profile strip adjoining the end portion.

7. The trim strip arrangement of claim 6 wherein the sealing profile or profile strip includes a colouration, and wherein the visible surface includes a colouration of the sealing profile or profile strip.

8. The trim strip arrangement of claim 7, wherein the end portion is a component produced in a multicomponent injection moulding process.

9. The trim strip arrangement of claim 7, wherein sealing profile includes a component composite portion having sealing lips and an inlay.

10. The trim strip arrangement of claim 9, wherein the component portion of the sealing profile is produced in a multicomponent injection moulding process.

11. The Trim strip arrangement of claim 10, wherein the end portion is an integral part of the sealing profile.

12. The trim strip arrangement of claim 6, wherein the end portion forms a component that is separate from the sealing profile and a profiled strip, and is placed at the end side onto the sealing profile or the profiled strip and held there as a front-face closure part.

13. The trim strip arrangement of claim 4, wherein the visible surface is black, and the reflection surface is white.

14. The trim strip arrangement of claim 1, further comprising a deflection pin formed in the end portion around which the light emitting means extends.

15. The trim strip arrangement of claim 1, further comprising a light guide holder formed in the end portion which grips circumferentially the light emitting means.

16. An illuminated trim strip arrangement, for a motor vehicle, configured to hold a light emitting means, comprising:
an end portion including an external visible surface, and an internal surface onto which at least a portion of the light that is emitted by the light-emitting means is incident before the light visibly emerges from the end portion;
wherein the internal surface includes a reflection surface having a reflectivity that is different with respect to the visible surface and the reflection surface includes a reflection coating.

17. The trim strip arrangement of claim 16, wherein the visible surface is black and the reflection surface is white.

18. The trim strip arrangement of claim 16, further comprising a reflection region located outside the end portion; wherein the reflectivity of the reflection surface matches the reflectivity in the reflection region of the trim strip arrangement located outside the end portion.

19. The trim strip arrangement of claim 16, further comprising a sealing profile or profile strip adjoining the end portion;
wherein the sealing profile or profile strip includes a colouration; and
wherein the visible surface includes a colouration of the sealing profile or profile strip.

20. The trim strip arrangement of claim 19, wherein the sealing profile includes an injection moulded component composite having a sealing lip and an inlay.

21. The trim strip arrangement of claim 16, further comprising a deflection pin formed in the end portion around which the light emitting means extends.

22. The trim strip arrangement of claim 16, further comprising a light guide holder formed in the end portion which grips circumferentially the light emitting means.

23. An illuminated trim strip arrangement, for a motor vehicle, configured to hold a light emitting means, comprising:
an end portion including an external visible surface, and an internal surface onto which at least a portion of the light that is emitted by the light-emitting means is incident before the light visibly emerges from the end portion;
wherein the internal surface includes a reflection surface having a reflectivity that is different with respect to the visible surface and the reflection surface is formed of a first material having a first reflectivity and the visible surface is formed of a second material having a second reflectivity and wherein the first reflectivity is greater than the second reflectivity.

24. The trim strip arrangement of claim 23, further comprising a reflection region located outside the end portion; wherein the reflectivity of the reflection surface matches the reflectivity in the reflection region of the trim strip arrangement located outside the end portion.

25. The trim strip arrangement of claim 23, further comprising a sealing profile or profile strip adjoining the end portion;
wherein the sealing profile or profile strip includes a colouration; and
wherein the visible surface includes a colouration of the sealing profile or profile strip.

26. The trim strip arrangement of claim 25, wherein the sealing profile includes an injection moulded component composite having a sealing lip and an inlay.

27. The trim strip arrangement of claim 23, further comprising a deflection pin formed in the end portion around which the light emitting means extends.

28. The trim strip arrangement of claim 23, further comprising a light guide holder formed in the end portion which grips circumferentially the light emitting means.

* * * * *